(12) United States Patent (10) Patent No.: US 12,557,890 B2

Bracken-Lobb (45) Date of Patent: Feb. 24, 2026

(54) HAIRCARE APPLIANCE

(71) Applicant: Dyson Technology Limited, Wiltshire (GB)

(72) Inventor: Jack Iain Bracken-Lobb, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 302 days.

(21) Appl. No.: 18/034,681

(22) PCT Filed: Oct. 13, 2021

(86) PCT No.: PCT/GB2021/052641

§ 371 (c)(1),
(2) Date: Apr. 29, 2023

(87) PCT Pub. No.: WO2022/090682

PCT Pub. Date: May 5, 2022

(65) Prior Publication Data

US 2023/0389671 A1 Dec. 7, 2023

(30) Foreign Application Priority Data

Nov. 2, 2020 (GB) ...................................... 2017304

(51) Int. Cl.
*G01N 27/22* (2006.01)
*A45D 20/08* (2006.01)
(Continued)

(52) U.S. Cl.
CPC .......... *A45D 20/08* (2013.01); *A46B 15/0014* (2013.01); *A46B 15/003* (2013.01);
(Continued)

(58) Field of Classification Search
CPC ........ G01N 27/02; G01N 27/04; G01N 27/22; G01N 27/223; G01N 27/225; G01N 27/226; G01N 27/228; A45D 20/50
See application file for complete search history.

(56) References Cited

U.S. PATENT DOCUMENTS

| | | | | |
|---|---|---|---|---|
| 10,722,017 | B1 * | 7/2020 | Abehasera | ........... A45D 20/124 |
| 2009/0189603 | A1 * | 7/2009 | Sherman | ............ G01R 33/0354 |
| | | | | 324/247 |

(Continued)

FOREIGN PATENT DOCUMENTS

| | | |
|---|---|---|
| CN | 205624990 U | 10/2016 |
| CN | 205813873 U | 12/2016 |

(Continued)

OTHER PUBLICATIONS

International Search Report and Written Opinion received for PCT Patent Application No. PCT/GB2021/052641, mailed on Jan. 21, 2022, 11 pages.

*Primary Examiner* — Herbert K Roberts

(74) *Attorney, Agent, or Firm* — Tucker Ellis LLP

(57) ABSTRACT

A haircare apparatus has a plurality of capacitive sensors, each capacitive sensor configured to provide a capacitance reading indicative of hair proximal to the haircare apparatus. The haircare apparatus has a moisture estimation module configured to estimate, based on capacitance readings of the plurality of capacitive sensors, a moisture level of the hair proximal to the haircare apparatus.

21 Claims, 11 Drawing Sheets

(51) Int. Cl.
  *A45D 20/50* (2006.01)
  *A46B 15/00* (2006.01)
  *A46B 9/02* (2006.01)

(52) U.S. Cl.
  CPC ...... *A46B 15/0038* (2013.01); *A46B 15/0051*
  (2013.01); *A46B 9/023* (2013.01); *A46B*
  *2200/104* (2013.01); *G01N 27/223* (2013.01)

(56) References Cited

U.S. PATENT DOCUMENTS

| | | | |
|---|---|---|---|
| 2012/0291797 A1 | 11/2012 | Degrood et al. | |
| 2012/0312320 A1 | 12/2012 | Humphreys et al. | |
| 2018/0209929 A1 * | 7/2018 | Yamazaki | ................. B60S 1/54 |

FOREIGN PATENT DOCUMENTS

| | | | | | |
|---|---|---|---|---|---|
| CN | 108135341 A | 6/2018 | | | |
| CN | 111345568 A | 6/2020 | | | |
| EP | 2524617 A2 | 11/2012 | | | |
| JP | 04-197306 A | 7/1992 | | | |
| JP | H057508 A | * | 1/1993 | | |
| JP | 2019126703 A | 8/2019 | | | |
| KR | 101909394 B1 | * | 10/2018 | .............. | A45D 1/04 |

* cited by examiner

HAIRCARE APPLIANCE

CROSS-REFERENCE TO PRIOR APPLICATION

This application is a § 371 National Stage Application of PCT International Application No. PCT/GB2021/052641 filed Oct. 13, 2021, which claims the priority of United Kingdom Application No. 2017304.3, filed Nov. 2, 2020, each of which are herein incorporated by reference in their entirety.

FIELD OF THE INVENTION

The present invention relates to a haircare apparatus.

BACKGROUND OF THE INVENTION

Hair naturally contains water as part of its structure, and the amount of water typically depends on the ambient conditions and the properties of the hair. When the water content of the hair reaches chemical equilibrium with the surrounding environment, the hair is generally considered to be 'dry'. Hair that has been blow-dried can be left in an 'over dry' or 'under dry' state. This may increase the susceptibility of hair to damage, as well as negatively affecting its look, feel, and the retention of any set style.

SUMMARY OF THE INVENTION

According to a first aspect of the present invention there is provided a haircare apparatus comprising a plurality of capacitive sensors, each capacitive sensor configured to provide a capacitance reading indicative of hair proximal to the haircare apparatus, and a moisture estimation module configured to estimate, based on capacitance readings of the plurality of capacitive sensors, a moisture level of the hair proximal to the haircare apparatus.

The haircare apparatus according to the first aspect of the present invention may be beneficial as the moisture estimation module estimates a moisture level of the hair proximal to the haircare apparatus based on capacitance readings of a plurality of capacitive sensors. This may provide a more accurate indication of moisture level than, for example, a haircare apparatus that uses a single capacitive sensor to estimate a moisture level of hair. Knowledge of a moisture level of hair proximal to the haircare apparatus may inform drying of the hair, such that temperature and/or mechanical damage of hair may be mitigated.

A capacitive sensor may comprise an electrode plate and drive circuitry, and, for example, hair proximal to the capacitive sensor may interact with an electric field produced by the capacitive sensor such that a capacitance value of the capacitive sensor is modified in use. Water has a relatively high relative permittivity, typically around 80 at room temperature, and so may have a relatively large influence on a capacitance value of the capacitive sensor when water is present in the hair. The present invention makes use of this and the moisture estimation module estimates a moisture level of the hair proximal to the haircare apparatus based on capacitance readings of the plurality of capacitive sensors.

The haircare apparatus may comprise at least 5 capacitive sensors, at least 10 capacitive sensors, at least 25 capacitive sensors, at least 50 capacitive sensors, or at least 100 capacitive sensors. An increased number of sensors may provide greater accuracy in estimating a moisture level of hair proximal to the haircare apparatus.

The haircare apparatus may comprise a hair interaction region, and the plurality of sensors may extend along substantially the entirety of a length of the hair interaction region. This may ensure that substantially all within the hair interaction region is considered when providing an estimation of moisture level. The hair interaction region may comprise a region in which the haircare apparatus directly or indirectly engages with hair. The hair interaction region may comprise a region in which bristles of the haircare apparatus contact hair in use. The hair interaction region may comprise a region in which heat and/or airflow is applied to hair by the haircare apparatus in use.

The plurality of sensors may be disposed in a row along the haircare apparatus, for example in a single row along the haircare apparatus. All of the capacitive sensors of the haircare apparatus may be disposed in a single row along the haircare apparatus.

The moisture estimation module may be configured to ignore readings from capacitive sensors corresponding to edges of hair proximal to the haircare apparatus, for example corresponding to edges of a volume of hair proximal to the haircare apparatus. The moisture estimation module may be configured to ignore readings from capacitive sensors which do not have hair proximal thereto in use. A capacitance value below a certain threshold may be indicative of the absence of hair.

Each of the plurality of capacitive sensors may comprise a width in the region of 0.5-5.0 mm, for example in the region of 1.0-1.5 mm. Each of the plurality of capacitive sensors may comprise a length in the region of 0.5-100.0 mm, for example in the region of 2.5-20.0 mm. Use of a plurality of relatively small capacitive sensors may enable more sensors to be utilised, which may enable increased accuracy in estimating a moisture level of hair proximal to the haircare apparatus. Length and width may comprise dimensions measured in directions orthogonal to one another.

The haircare apparatus may comprise a controller configured to control an output parameter of the haircare apparatus based on the estimated moisture level. This may be beneficial as it may reduce user input needed to control the haircare apparatus, and may allow for automatic control of the haircare apparatus in response to estimated moisture level of hair. The output parameter may comprise any of airflow, airflow temperature, or ion content.

The haircare apparatus may comprise a heater configured to provide heat to the hair proximal to the haircare apparatus, and a controller configured to control the heater based on the estimated moisture level of the hair proximal to the haircare apparatus. Control of the heater in response to the estimated moisture level of the hair proximal to the haircare apparatus may inhibit over-drying of the hair, and may reduce the risk of thermal or mechanical hair damage. The controller may be configured to automatically control the heater based on the estimated moisture level of the hair proximal to the haircare apparatus. This may reduce a level of user interaction required with the haircare apparatus. The controller may be configured to increase and/or decrease a temperature of the heater based on the estimated moisture level of the hair proximal to the haircare apparatus.

The moisture estimation module may be configured to estimate the moisture level of hair proximal to the haircare apparatus based on a temperature of the heater. The relative permittivity of water may change depending on temperature, and factoring temperature into the estimation performed by the moisture estimation module may enable a more accurate estimation of moisture level.

The haircare apparatus may comprise an airflow generator configured to provide an airflow to the hair proximal to the haircare apparatus, and a controller configured to control the airflow generator based on the estimated moisture level of the hair proximal to the haircare apparatus. Control of the airflow generator in response to the estimated moisture level of the hair proximal to the haircare apparatus may inhibit over-drying of the hair, and may reduce the risk of thermal or mechanical hair damage. The controller may be configured to automatically control the airflow generator based on the estimated moisture level of the hair proximal to the haircare apparatus. This may reduce a level of user interaction required with the haircare apparatus. The controller may be configured to increase and/or decrease an airflow rate of airflow generated by the airflow generator based on the estimated moisture level of the hair proximal to the haircare apparatus.

The moisture estimation module may be configured to estimate the moisture level of hair proximal to the haircare apparatus based on a value indicative of airflow temperature at an air outlet of the haircare apparatus. The value indicative of airflow temperature at the air outlet of the haircare apparatus may comprise a value obtained by direct measurement of temperature of airflow at the air outlet, for example by a temperature sensor. The value indicative of airflow temperature may comprise a value obtained indirectly, for example by inferring the airflow temperature based on a temperature of the heater. The value indicative of airflow temperature at the air outlet may be indicative of temperature of the hair. The relative permittivity of water may change depending on temperature, and factoring temperature into the estimation performed by the moisture estimation module may enable a more accurate estimation of moisture level.

The moisture estimation module may be configured to estimate the moisture level of hair proximal to the haircare apparatus based on a value indicative of airflow rate of airflow generated by the airflow generator.

The haircare apparatus may comprise an alert module configured to alert a user to the estimated moisture level of the hair proximal to the haircare apparatus. This may enable a user to determine when to stop using the haircare apparatus, for example such that over-drying of hair does not occur. The alert module may be configured to alert a user to the estimated moisture level of the hair proximal to the haircare apparatus where the estimated moisture level is below a pre-determined moisture threshold, for example.

The alert module may comprise a haptic feedback module, for example configured to provide haptic feedback to a user indicative of the estimated moisture level. This may ensure that an alert is provided to a user irrespective of whether or not the haircare apparatus is visible to the user.

The alert module may comprise a visual indicia of the estimated moisture level of the hair proximal to the haircare apparatus. For example, the alert module may comprise an LED or a visual display screen to communicate the estimated moisture level to a user of the haircare apparatus. A visual indicia may provide a simple means of communicating the alert to the user.

The alert module may comprise an aural indicia of the estimated moisture level of hair proximal to the haircare apparatus. For example the alert module may comprise a speaker to communicate the estimated moisture level to a user of the haircare apparatus.

The haircare apparatus may comprise a transmitter configured to transmit the estimated moisture level of the hair proximal to the haircare apparatus to a remote user device.

This may enable the estimated moisture level to be displayed or processed remotely from the haircare apparatus.

The remote user device may comprise a remote computing device, for example smartphone or tablet. The remote user device may be configured to communicate with the haircare apparatus, for example to control the haircare apparatus based on the estimated moisture level.

The remote user device may comprise a further haircare apparatus, for example a further haircare apparatus comprising a heater and/or an airflow generator. The remote user device may be controlled based on the estimated moisture level. For example, the haircare apparatus may comprise a hairbrush, and the remote user device may comprise a hairdryer. Here the hairbrush may be in closer proximity to hair than the hairdryer, and may enable a higher accuracy of moisture level to be determined, whilst the hairdryer may be controlled based on the estimated moisture level.

The plurality of capacitive sensors may comprise self-capacitance sensors. The plurality of capacitive sensors may comprise mutual capacitance sensors.

The haircare apparatus may comprise a main body, and an attachment releasably attached to the main body, wherein the attachment comprises the plurality of capacitive sensors. This may enable the plurality of capacitive sensors to be retrofitted to an existing haircare apparatus by virtue of the releasable attachment. The moisture determination module may be disposed in the attachment.

The attachment may be configured to communicate the estimated moisture level of the hair proximal to the haircare apparatus to the main body, for example to a heater and/or airflow generator, and/or an alert module and/or a controller of any of a heater, airflow generator or alert module, disposed in the main body.

The attachment may comprise a power source configured to power the plurality of sensors.

The haircare apparatus may comprise first and second arms that define a hair treatment chamber, and the plurality of sensors may be located on one of the first and second arms such that the plurality of sensors are exposed to hair within the hair treatment chamber in use. Use of a plurality of capacitive sensors in such a format of haircare apparatus may be beneficial compared to, for example, a haircare apparatus having a plurality of sensors that enable estimation of moisture level via contact with the first and/or second arms. For example, resistive sensors may require contact with hair in use, and this may cause electrolysis of heating plates of existing hair straighteners.

According to a second aspect of the present invention there is provided an attachment for a haircare apparatus, wherein the attachment comprises a plurality of capacitive sensors, each capacitive sensor configured to provide a capacitance reading indicative of hair proximal to the attachment, and a moisture estimation module configured to estimate, based on capacitance readings of the plurality of capacitive sensors, a moisture level of the hair proximal to the attachment.

Optional features of aspects of the present invention may be equally applied to other aspects of the present invention, where appropriate.

DETAILED DESCRIPTION OF THE INVENTION

A haircare apparatus, generally designated 10, according to the first aspect of the present invention is illustrated schematically in FIGS. 1, 2, 4 and 5.

The haircare apparatus 10 comprises a main body 12, and an attachment 100 removably attachable to the main body 12. Although shown here as releasable components, embodiments are also envisaged where the main body 12 and the attachment 100 are a single-piece, ie monolithic, structure.

Figure 2:
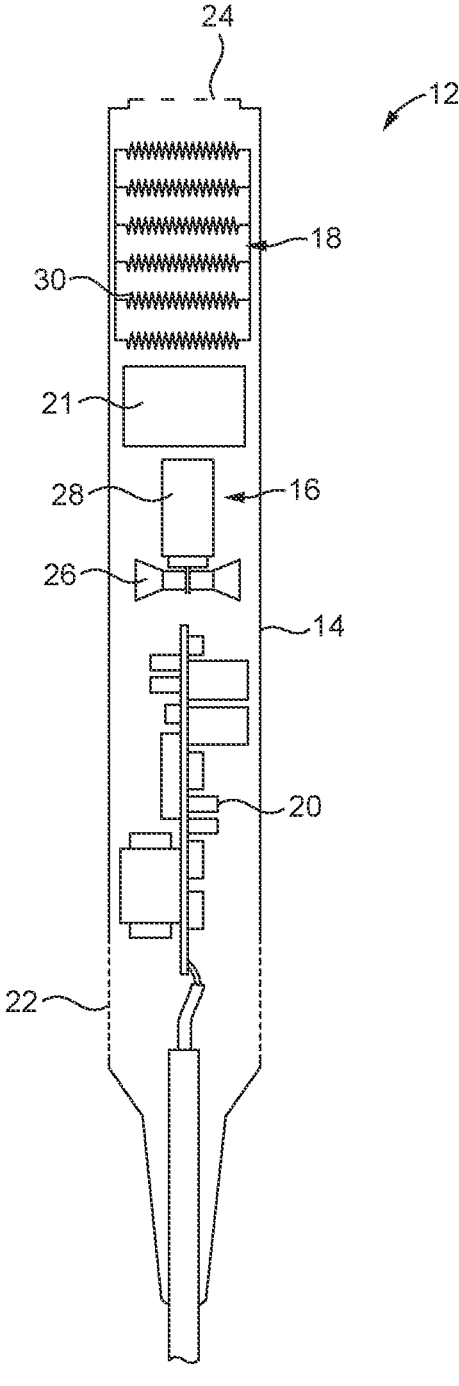
FIG. 2 is a schematic cross-section through a main body of the haircare apparatus of FIG. 1.

The main body 12 comprises a housing 14, an airflow generator 16, a heater 18, a control unit 20, and a moisture estimation module 21, as can be seen schematically in FIG. 2.

The housing 14 is tubular in shape, and comprises an air inlet 22 through which an airflow is drawn into the housing 14 by the airflow generator 16, and an air outlet 24 through which the airflow is discharged from the housing 14. The airflow generator 16 is housed within the housing 14, and comprises an impeller 26 driven by an electric motor 28. The heater 18 is also housed within the housing 14, and comprises heating elements 30 to optionally heat the airflow.

Figure 1:
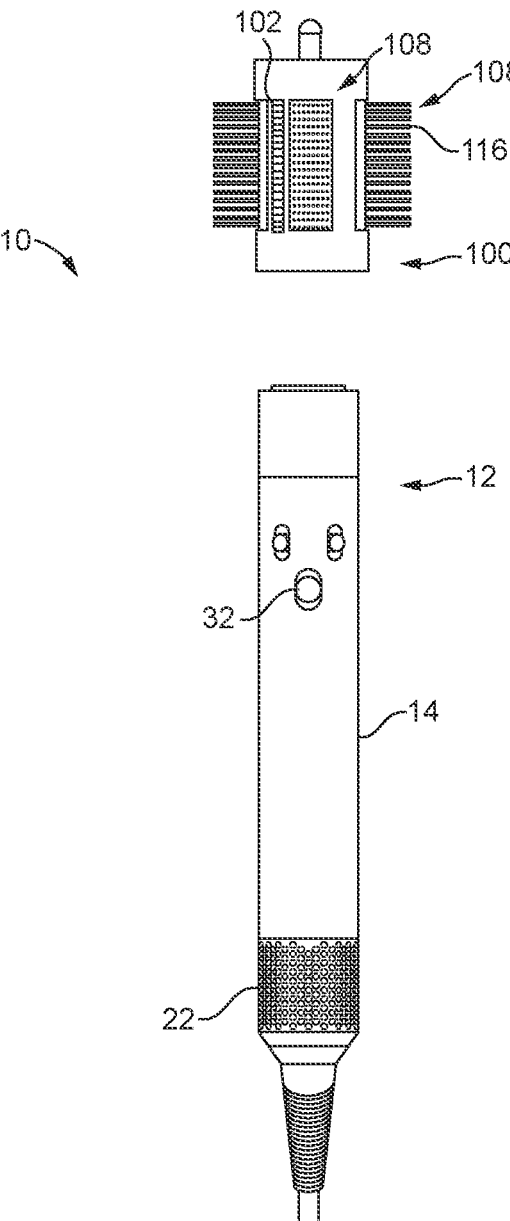
FIG. 1 is a schematic illustration of a haircare apparatus according to the present invention.

The control unit 20 comprises electronic circuitry for a user interface 32, an RFID reader 34, and a control module 36. The user interface 32 is provided on an outer surface of the housing 14, and is used to power on and off the haircare apparatus 10, to select a flow rate (for example high, medium and low), and to select an airflow temperature (for example hot or cold). In the example of FIG. 1 the user interface comprises a plurality of sliding switches, but other forms of user interface 32, for example buttons, dials or touchscreens, are also envisaged.

The RFID reader 34 comprises an antenna 38 and a reader module 40. The RFID reader 34 is to interrogate an RFID tag 104 that forms part of the attachment 100. As will be described in more detail below, the attachment 100 comprises a plurality of capacitive sensors 102 which provide capacitance measurements in response to hair proximal to the attachment 100, and the data returned by the RFID tag

104 includes the capacitance measurements of the plurality of capacitive sensors 102. The RFID reader 34 outputs data indicative of capacitance measurements from the plurality of capacitive sensors 102 to the moisture estimation module 21.

The control module 36 is responsible for controlling the airflow generator 16, and the heater 18 in response to inputs from the user interface 32. For example, in response to inputs from the user interface 32, the control module 36 may control the power or the speed of the airflow generator 16 in order to adjust the airflow rate of the airflow, and the power of the heater 18 in order to adjust the temperature of the airflow.

The control module 36 also controls the airflow generator 16 and the heater 18 in response to an input from the moisture estimation module 21, as will be discussed hereafter.

Figure 4:
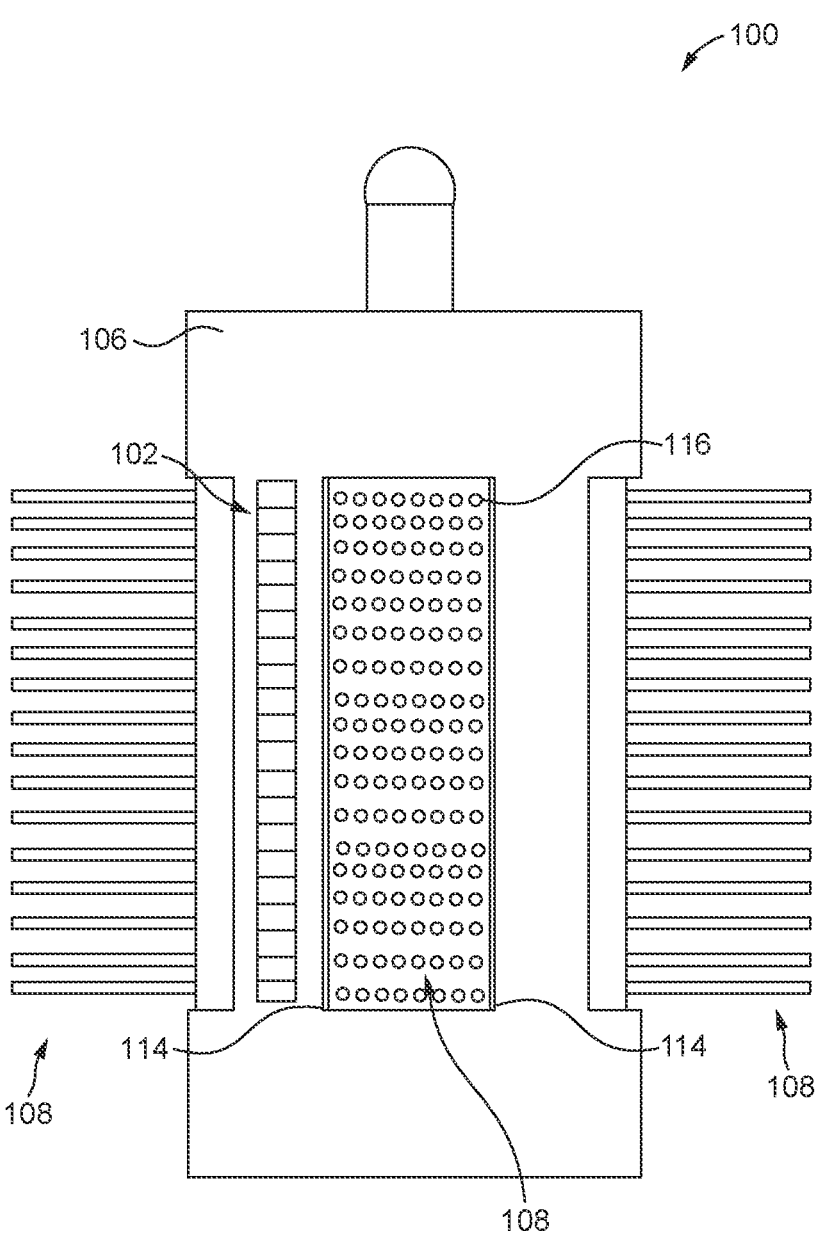
FIG. 4 is a schematic view illustrating an exterior of an attachment of the haircare apparatus of FIG. 1.
Figure 5:
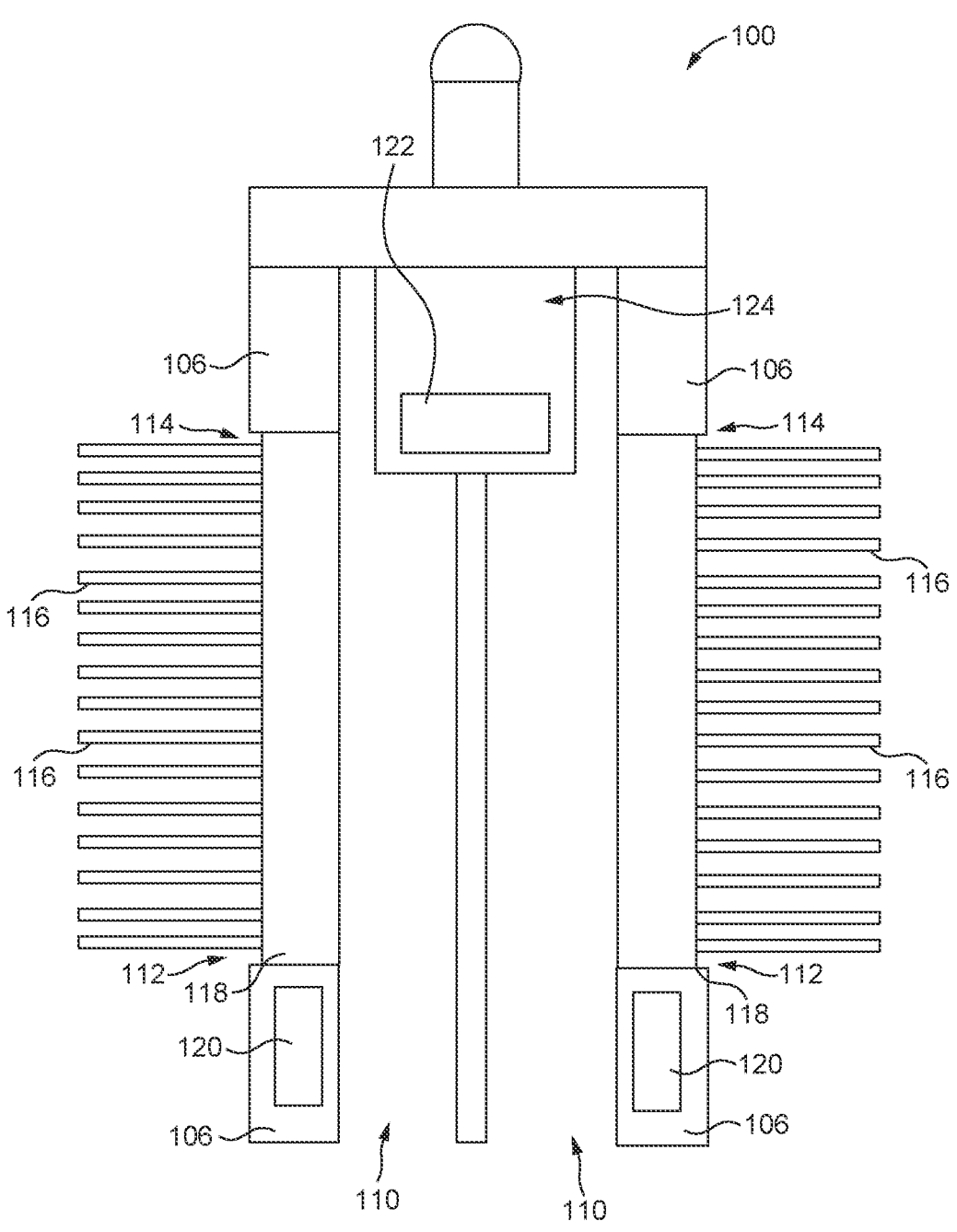
FIG. 5 is a schematic cross-sectional view of the attachment of FIG. 4.

An exterior view of the attachment 100 is shown in FIG. 4, with a cross-section through the attachment shown schematically in FIG. 5. As noted above, the attachment 100 comprises a plurality of capacitive sensors 102 configured to generate a signal indicative of hair contacting the attachment 100, and an RFID tag 104. The attachment 100 also comprises a main body 106, and a plurality of bristle beds 108. The bristle beds 108 define a hair interaction region.

The main body 106 is generally cylindrical in form, and is open at one end and closed at the other end. The open end serves as an inlet 110 into the main body 106. The main body 106 has a plurality of apertures 112 within which the bristle beds 108 are pivotably mounted, with movement of the bristle beds 108 within the apertures 112 causing air outlets 114 of the attachment 100 to be selectively opened between longitudinal edges of the bristle beds 108 and the apertures 112. The exact form of pivotal mounting is unimportant save that it allows motion of the bristle bed 108 within the aperture 112 in the manner described herein, although it is noted that the bristle beds 108 may each comprise an arm connected to a common central connector housed within the main body 106, with each arm having a pivot point to which a body portion 118 of the bristle bed is centrally attached.

Each bristle bed 108 is biased into a rest position by airflow at a first relatively low flow rate. In other alternative embodiments, each bristle bed 108 may be resiliently biased into the rest position by a resilient member such as a spring or the like. The bristle beds 108 may be thought of as movable members of the attachment 100, and each comprises a plurality of bristles 116 upstanding from the body portion 118. The bristles 116 are contactable with hair in use, with engagement of the hair with the bristles 116 causing movement of the body portion 118, and hence movement of the bristle bed 108, within the corresponding aperture to open the air outlet 114 and enable air to flow out from the attachment 100. The air outlets 114 in some examples may still be present in the absence of hair contact with the bristles, ie when the bristle beds 108 are in their rest configurations, but may have a minimal opening size in such a configuration so that only diffuse airflow is permitted from the air outlets 114 in the absence of contact with hair.

The RFID tag 104 comprises an antenna 120 and an integrated circuit 122. The antenna 120 is located towards the bottom of the main body 106 within a recess in a wall of the main body 106, and comprises an annular coil. The integrated circuit 122 is located towards the top of the main body 106 and is housed within a chamber 124 that is sealed relative to airflow through the main body 106. The antenna 120 and the integrated circuit 122 are connected by conductive tracks (not shown) provided along the inner surface of the main body 106. The integrated circuit 122 comprises components typical of an RFID tag, such as a rectifier, microcontroller and load modulator.

The RFID tag 104 is energised by an interrogation signal transmitted by the RFID reader 34. Upon energisation, the RFID tag 104 transmits data to the RFID reader 34. The data returned by the RFID tag 104 is a signal that includes capacitance measurements from the plurality of capacitive sensors 102.

Figure 3:
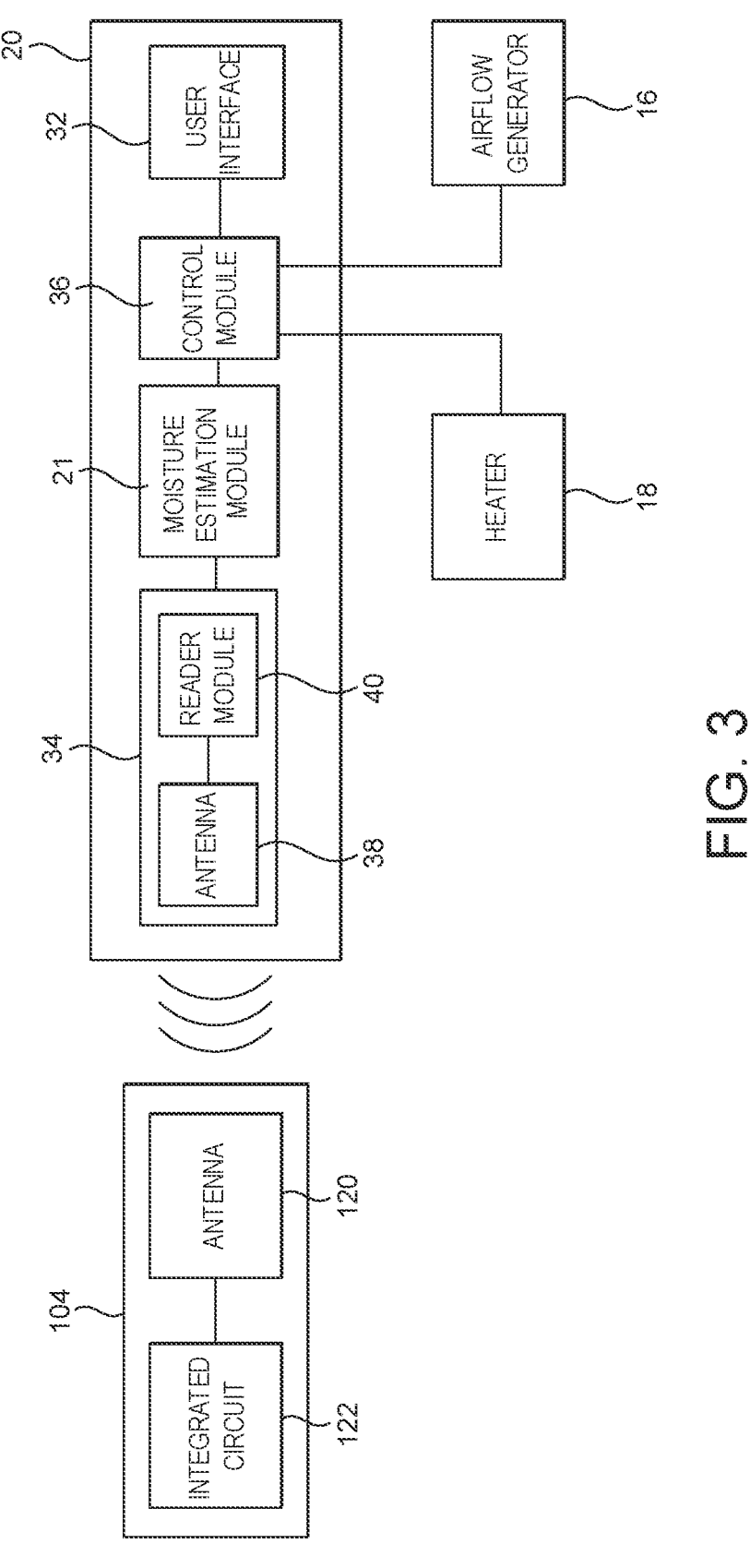
FIG. 3 is a schematic view illustrating communication between electrical components of the haircare apparatus of FIG. 1

A schematic diagram illustrating the communication between the RFID tag, the RFID reader 34, and other electrical components of the haircare apparatus, is shown in FIG. 3.

The plurality of capacitive sensors 102 are illustrated schematically on the attachment 100 in FIG. 4. The plurality of capacitive sensors 102 are disposed in a row between adjacent bristle beds 108. Although shown here as a single row, it will be appreciated that number of rows of capacitive sensors 102 may be provided, for example with one row between each adjacent bristle bed 108.

Each of the plurality of capacitive sensors 102 comprises an electrode and appropriate drive electronics. The capacitive sensors 102 may be arranged as self- or mutual-capacitance sensors, as appropriate. Each capacitive sensor 102 has a width in the region of 0.5-5.0 mm, for example in the region of 1.0-1.5 mm, and a length in the region of 0.5-100.0 mm, for example in the region of 2.5-20.0 mm. In the embodiment of FIG. 1 20 capacitive sensors are illustrated, but it will be appreciated that fewer or greater numbers of capacitive sensors 102 are envisaged, for example at least 5 capacitive sensors, at least 10 capacitive sensors, at least 25 capacitive sensors, at least 50 capacitive sensors, or at least 100 capacitive sensors.

In use the capacitive sensors 102 measure a capacitance reading indicative of hair proximal to the attachment 100, with the capacitance reading being transferred via the RFID link to the moisture estimation module 21 disposed in the main body 12. The moisture estimation module 21 then utilises the capacitance readings from the plurality of capacitive sensors 102 to estimate a moisture level of the hair proximal to the attachment 100. In particular, water has a relatively high relative permittivity, typically around 80 at room temperature, and so may have a relatively large influence on a capacitance value of the capacitive sensor 102 when water is present in the hair. The present invention makes use of this and the moisture estimation module 21 estimates a moisture level of the hair proximal to the haircare apparatus 10 based on capacitance readings of the plurality of capacitive sensors 102.

In general, a higher capacitance level may be considered indicative of a greater moisture content of hair. Furthermore, a higher moisture level may be indicative of a greater weight of hair in view of the moisture retained. A plot illustrating the relationship between weight of hair and capacitance level for a given tress of hair is illustrated schematically in FIG. 6.

Figure 6:
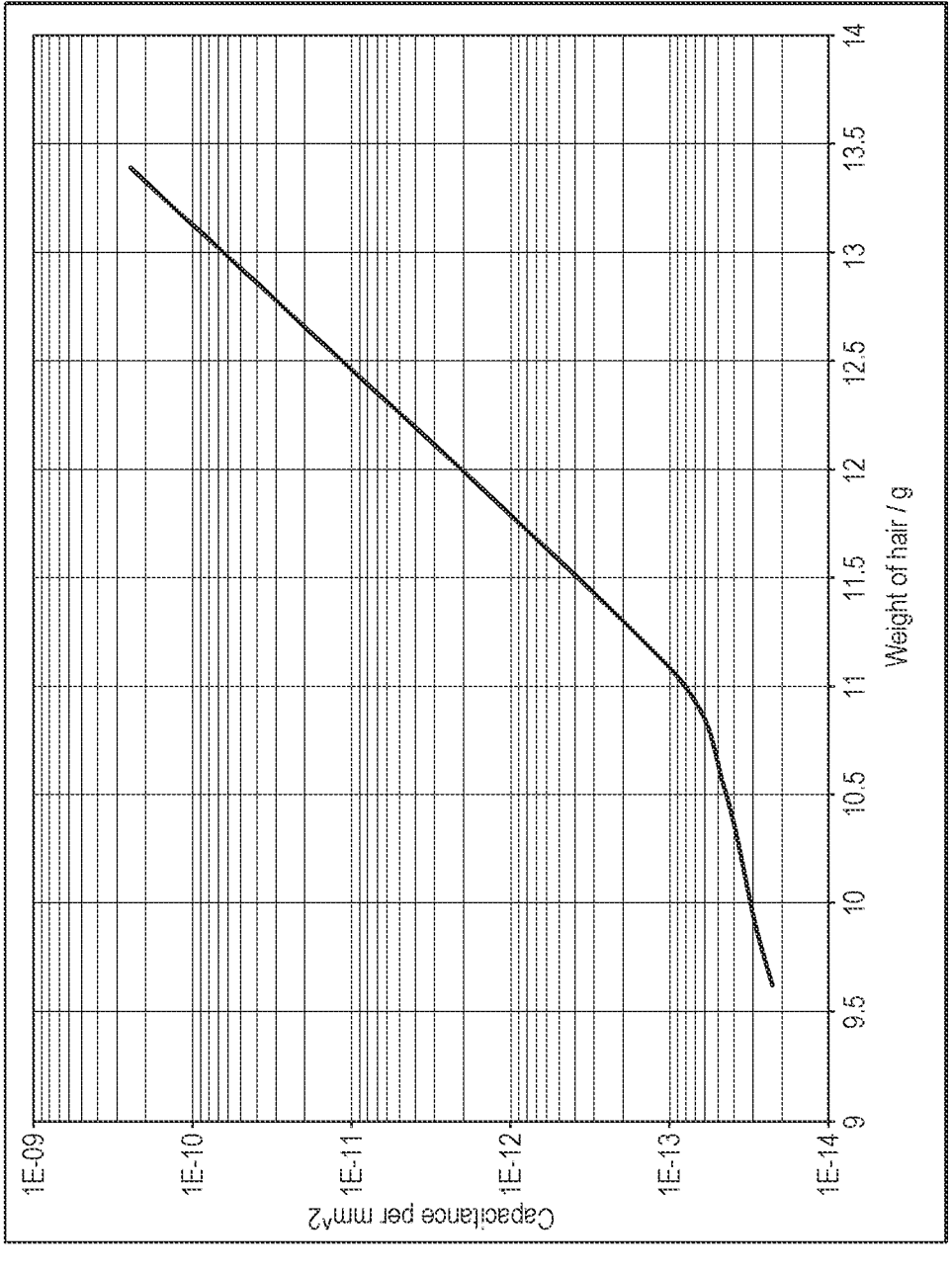
FIG. 6 is a graph illustrating a relationship between capacitance value and weight of hair.

In the plot of FIG. 6 dry hair is allocated a moisture level of 0%, and dry hair is determined to have a weight of 9.578 g. The corresponding capacitance value of dry hair is 2.267E-14 F/mm² of plate area of the capacitive sensor 102. Wet hair is allocated a moisture level of 0%, and wet hair is determined to have a weight of 13.399 g. The corresponding capacitance value of wet hair is 2.475E-10 F/mm² of plate area of the capacitive sensor 102. A moisture level of 100% may be determined to be indicative of a so-called "towel-dry" hair condition, where hair has been towel-dried before drying and/or styling using the haircare appliance 10.

If a linear relationship is assumed between wet and dry conditions, then the plurality of capacitive sensors 102 may be used to estimate a moisture level of hair in use, for example with the moisture estimation module 21 utilising the relationship illustrated in the plot of FIG. 6.

In such a manner a moisture level of hair proximal to the attachment 100 is estimated. Using a plurality of capacitive sensors 102 may provide a more accurate indication of moisture level than, for example, a haircare apparatus that uses a single capacitive sensor to estimate a moisture level of hair.

The estimated moisture level is fed from the moisture estimation module 21 to the control module 36, with the control module 36 controlling the airflow generator 16 and the heater 18 in response to the estimated moisture level, for example decreasing temperature and flow rate as a moisture level of the hair proximal to the attachment 100 decreases. Although described as a single control module 36, it will be appreciated that in practice there may be separate controllers for the airflow generator 16 and the heater 18, and it will further be appreciated that embodiments are envisaged where only one of the airflow generator 16 and the heater 18 are controlled in response to the moisture estimation module 21.

In some examples, such as the example of FIG. 1, edge readings from capacitive sensors 102 corresponding to the edges of hair proximal to the haircare apparatus 10 may be ignored. This may ensure accuracy of readings taken from the plurality of capacitive sensors 102. Readings from capacitive sensors 102 that do not detect hair may also be ignored in use.

In some examples, the moisture estimation module 21 estimates moisture based on a temperature of airflow at the air outlets 114 of the attachment 100. In particular, in such an embodiment a temperature of airflow at the air outlets 114 can be either directly or indirectly obtained, and used to infer a temperature of the hair proximal to the attachment. Incorporating temperature of the hair in the estimation of moisture level may enable a more accurate estimation as the relative permittivity of water changes with temperature.

Whilst in the embodiment of FIG. 1 the moisture estimation module 21 feeds an estimated moisture level to the control module 36, and the control module 36 controls the airflow generator 16 and the heater 18 in response to the estimated moisture level, alternative embodiments where the estimated moisture level is used differently are also envisaged.

Figure 7:
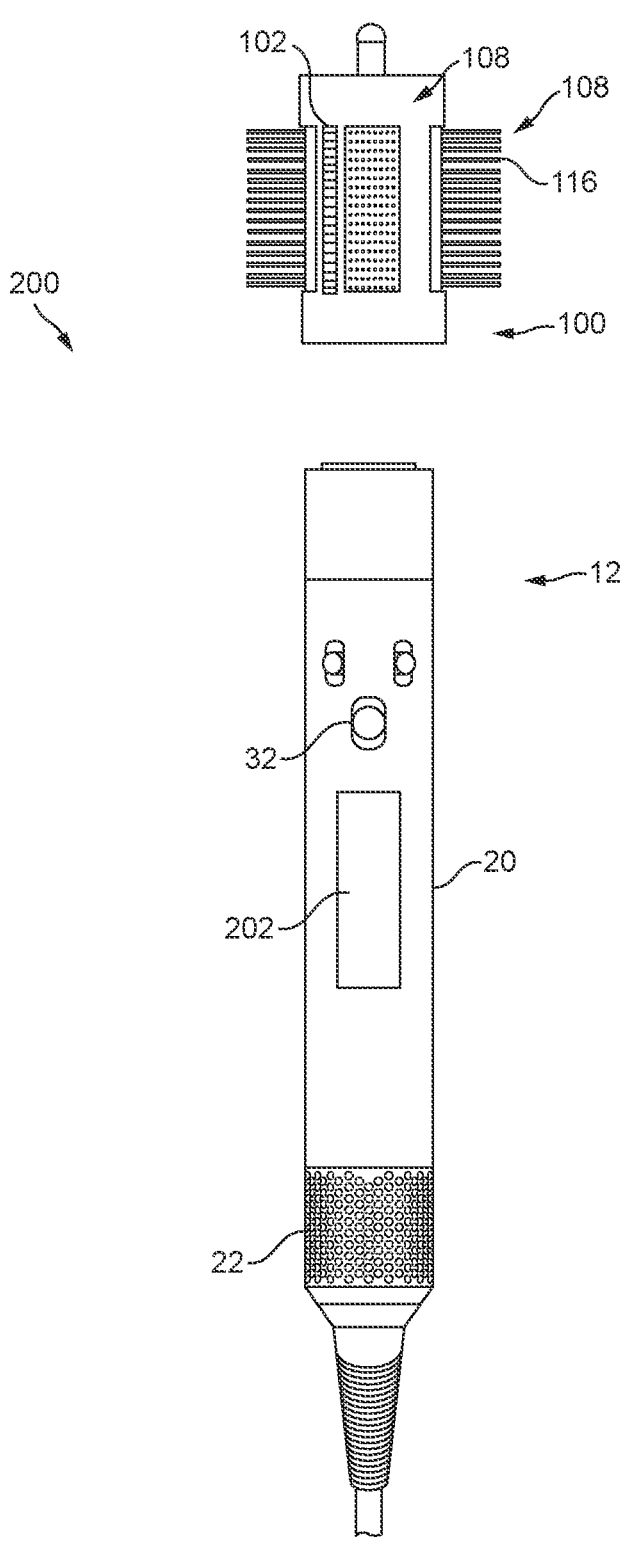
FIG. 7 is a schematic illustration of a first alternative embodiment of a haircare apparatus according to the present invention.

One such alternative embodiment is illustrated schematically in FIG. 7, where the haircare apparatus 200 comprises an alert module 202. The alert module 202 is disposed in the main body 14, and the moisture estimation module 21 is configured to communicate an estimated moisture level to the alert module 202. The alert module 202 is configured to alert a user to the estimated moisture level of the hair proximal to the attachment 100. The alert module may comprise any components capable of providing such an alert to a user, including any of a haptic feedback module, a visual indicia and an aural indicia.

Figure 8:
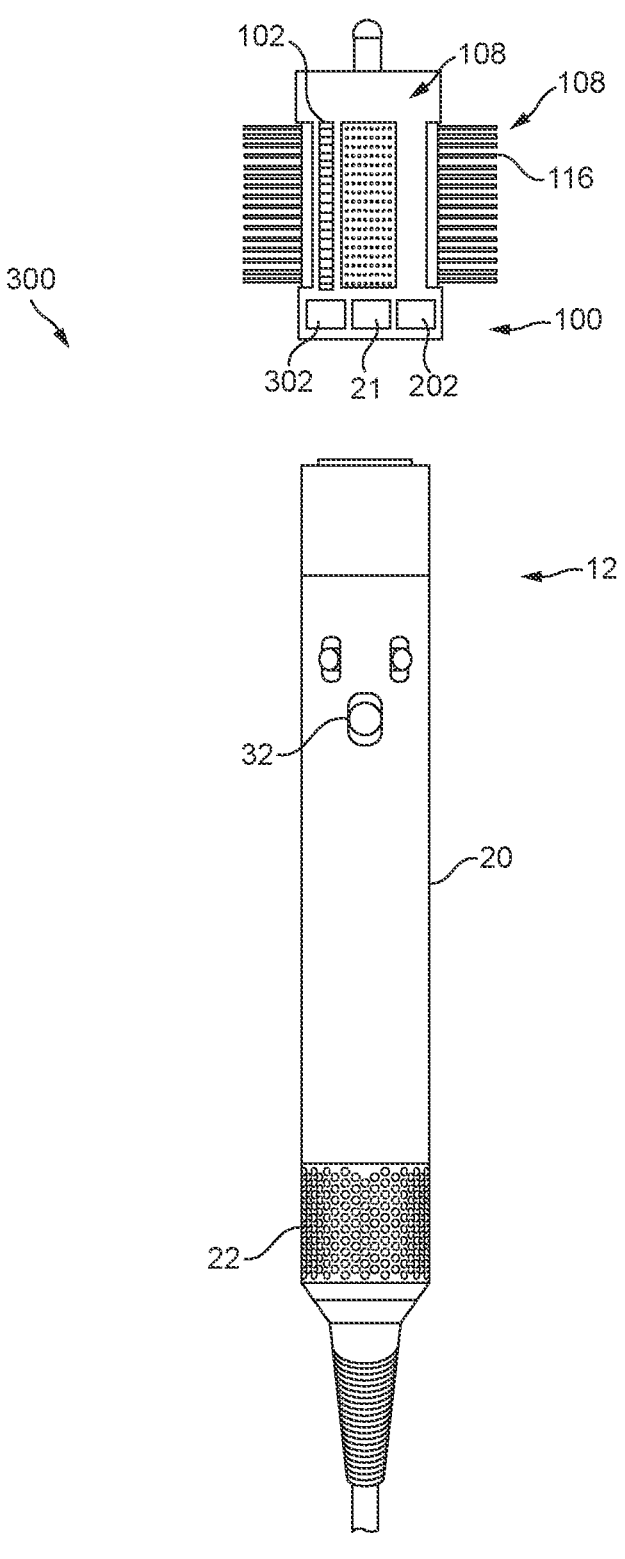
FIG. 8 is a schematic illustration of a second alternative embodiment of a haircare apparatus according to the present invention.

Another alternative embodiment of a haircare apparatus 300 is illustrated schematically in FIG. 8. The haircare apparatus 300 of FIG. 8 includes a power source 302 housed within the attachment 100, and the moisture estimation module 21 and alert module 202 are also disposed in the attachment 100. The power source 302 powers the plurality of capacitive sensors 102, the moisture estimation module 21, and the alert module 202, and comprises a battery, which may be rechargeable. In such an embodiment the attachment 100 may provide a self-contained unit that is capable of estimating a moisture level of hair proximal to the attachment 100, and may, for example, be retrofitted to an existing main body of a haircare apparatus.

In the embodiment of FIG. 8, the attachment 100 may still be in communication with the main body 12, and hence the control module 36 may still receive the estimated moisture level from the moisture estimation module 21. Although described herein as an RFID connection between the main body 12 and the attachment 100, it will be appreciated that other types of wireless communication, for example Bluetooth® or the like, are also envisaged, and indeed that physical communication connections between the attachment 100 and the main body 12 may also be utilised. It will further be appreciated that in some embodiments the plurality of capacitive sensors 102 may be disposed on the main body 12, for example on a spur of the main body with the attachment 100 fitting over the spur via an aperture of the like. This may enable use of physical communication connections whilst also removing complexity and cost from the attachment 100.

Figure 9:
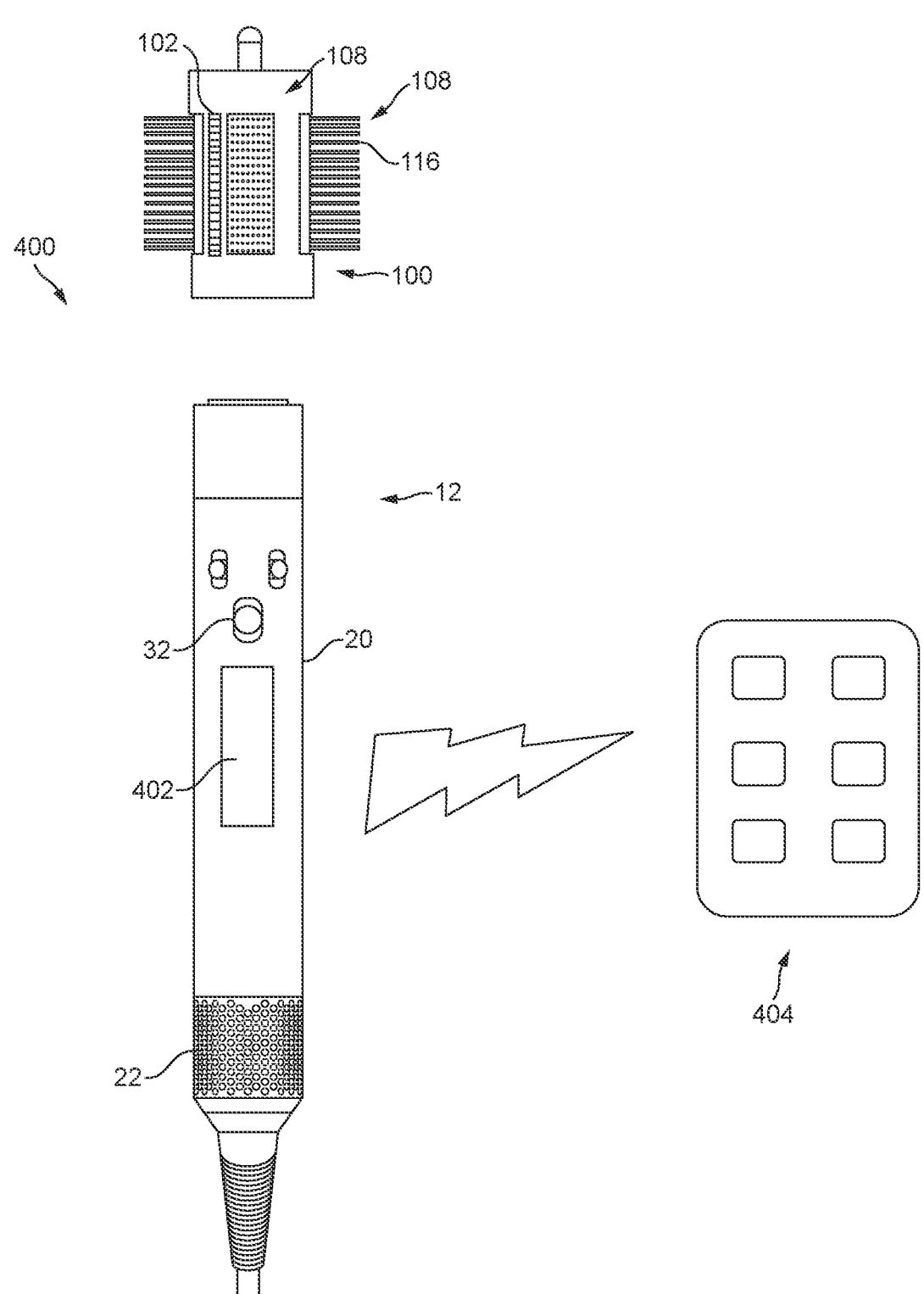
FIG. 9 is a schematic illustration of a third alternative embodiment of a haircare apparatus according to the present invention.

A further embodiment of haircare apparatus 400 is illustrated schematically in FIG. 9. Here the haircare apparatus 400 comprises a transmitter 402 housed in the main body 12, with the transmitter 402 configured to receive the estimated moisture level from the moisture estimation module 21 and to transmit the estimated moisture level to a remote user device 404. The remote user device 404 in the embodiment of FIG. 9 is illustrated as a mobile phone, although other remote user devices, for example tablets or other computing devices, are also envisaged. The estimated moisture content is displayed on the remote user device 404, for example on an application running on the remote user device 404, and a user may respond to the alert, for example by turning off the haircare apparatus 400 or modifying one or more settings of the haircare apparatus 400, either via engagement with the user interface 32 or via remote communication with the haircare apparatus 400 via the remote user device 404.

Figure 10:
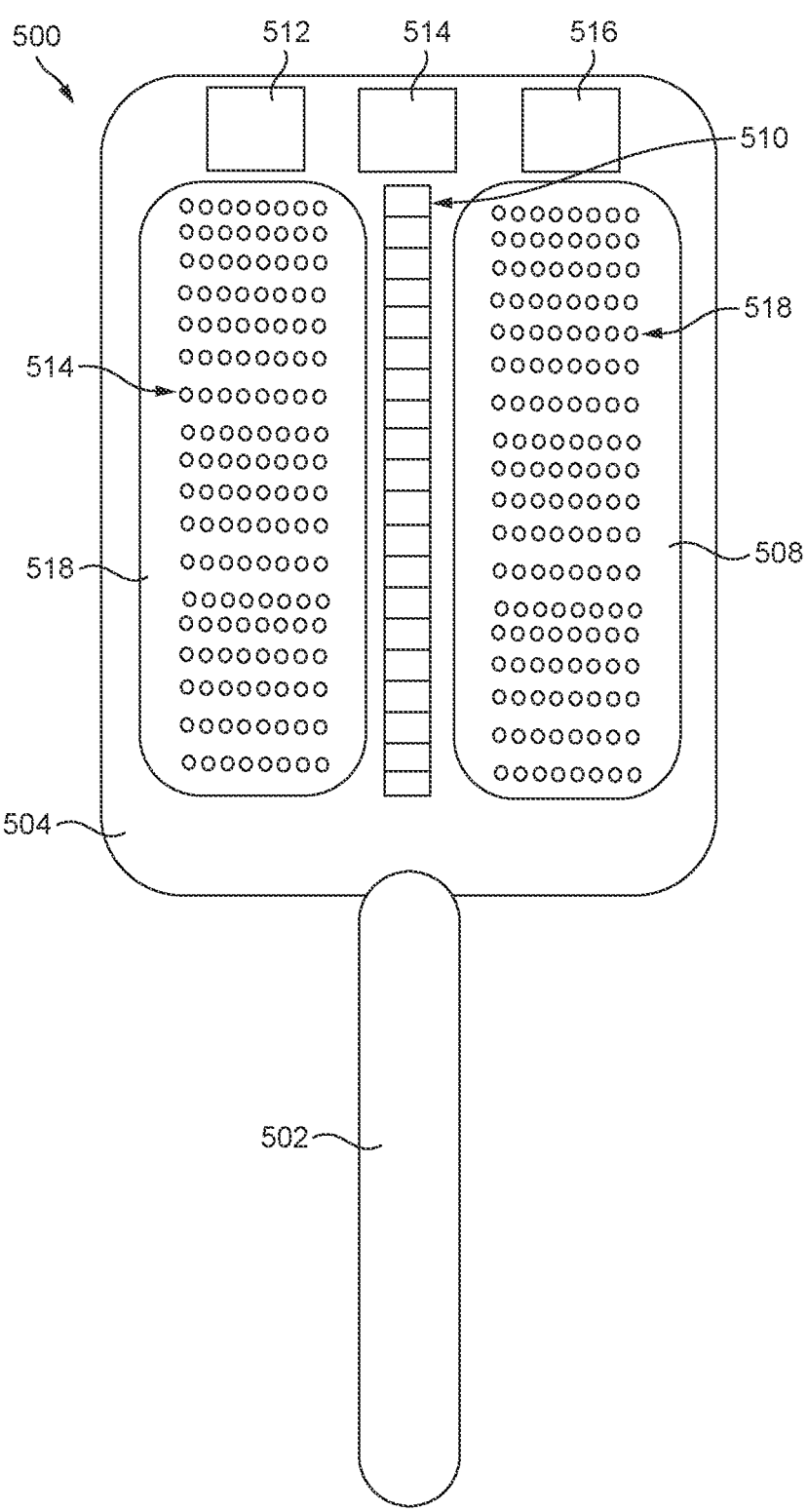
FIG. 10 is a schematic illustration of a fourth alternative embodiment of a haircare apparatus according to the present invention.

An alternative embodiment of haircare apparatus 500 is illustrated schematically in FIG. 10. The haircare apparatus 500 of FIG. 9 takes the form of a hairbrush having a handle portion 502 and a hair engaging portion 504. The hair engaging portion 504 comprises first 506 and second 508 bristle beds, with a plurality of capacitive sensors 510 arranged in a single row between the first 506 and second 508 bristle beds, and a transmitter 512 housed internally of the hair engaging portion 504. The haircare apparatus 500 further comprises a moisture estimation module 514 and a power source 516. The power source 516 powers the plurality of capacitive sensors 510, the transmitter 512, and the moisture estimation module 514. The power source 516 is a battery, which may be rechargeable.

Each of the first 504 and second 508 bristle beds comprises a plurality of upstanding bristles 518 for engaging hair in use.

Each of the plurality of capacitive sensors 510 comprises an electrode and appropriate drive electronics. The capacitive sensors 510 may be arranged as self- or mutual-capacitance sensors, as appropriate. Each capacitive sensor 510 has a width in the region of 0.5-5.0 mm, for example in the region of 1.0-1.5 mm, and a length in the region of 0.5-100.0 mm, for example in the region of 2.5-20.0 mm. In the embodiment of FIG. 10 20 capacitive sensors are illustrated, but it will be appreciated that fewer or greater numbers of capacitive sensors 510 are envisaged, for example at least 5 capacitive sensors, at least 10 capacitive sensors, at least 25 capacitive sensors, at least 50 capacitive sensors, or at least 100 capacitive sensors.

In use the capacitive sensors 510 measure a capacitance reading indicative of hair proximal to the haircare apparatus 500, with the capacitance reading being sent to the moisture estimation module 514. The moisture estimation module 514 transmits an estimated moisture level of hair proximal to the haircare apparatus 500, via the transmitter 512, to a further device remote from the haircare apparatus 500.

For example, in one embodiment the further device may be a hairdryer or the like, with the combination of the haircare apparatus 500 and the further device enabling appropriate control of the further device, either automatically or via user intervention, in response to the plurality of capacitive sensors 502 and the estimated moisture level of hair proximal to the haircare apparatus 500.

Figure 11:
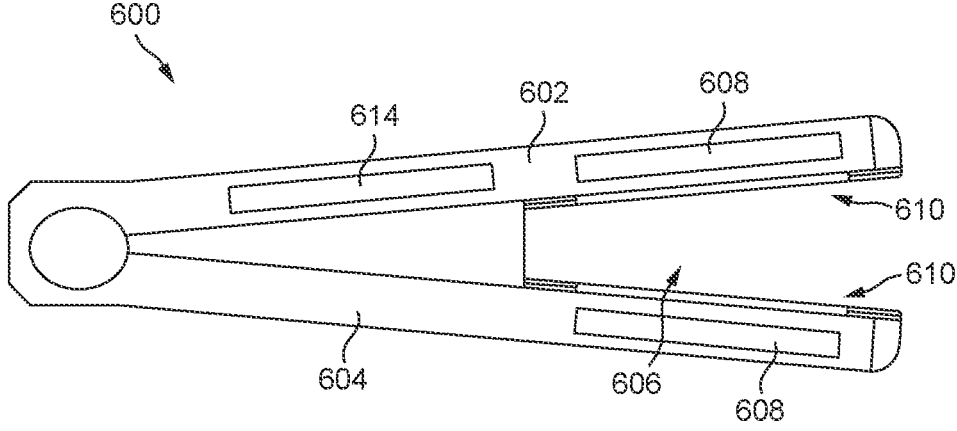
FIG. 11 is a first schematic illustration of a fifth alternative embodiment of a haircare apparatus according to the present invention.
Figure 12:
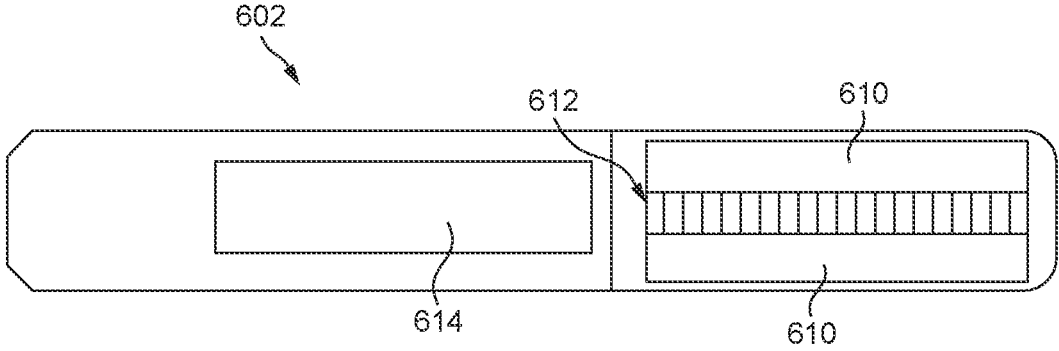
FIG. 12 is a second schematic illustration of the haircare apparatus of FIG. 11.

A further alternative embodiment of a haircare apparatus 600 is illustrated schematically in FIGS. 11 and 12. The haircare apparatus 600 of FIGS. 11 and 12 takes the form of a hair straightener.

The haircare apparatus 600 comprises first 602 and second 604 arms spaced apart to define a hair treatment chamber 606. The first 602 and second 604 arms are pivotally connected such that a width of the hair treatment chamber 606 can be selectively varied by a user of the haircare apparatus. Each of the first 602 and second 604 arms houses a heater 608, and each of the first 602 and second 604 arms comprises a heating plate 610 that is heated by its respective heater 608 in use. The heating plates 610 at least partially define the hair treatment chamber 606.

The haircare appliance 600 further comprises a plurality of capacitive sensors 612 arranged in a row along a recess formed in the heating plate 610 of the first arm 602, and a moisture estimation module 614 located within the first arm 602. Each of the plurality of capacitive sensors 612 comprises an electrode and appropriate drive electronics. The capacitive sensors 612 may be arranged as self- or mutual-capacitance sensors, as appropriate. Each capacitive sensor 612 has a width in the region of 0.5-5.0 mm, for example in the region of 1.0-1.5 mm, and a length in the region of 0.5-100.0 mm, for example in the region of 2.5-20.0 mm. In the embodiment of FIGS. 11 and 12, 20 capacitive sensors are utilised, but it will be appreciated that fewer or greater numbers of capacitive sensors 610 are envisaged, for example at least 5 capacitive sensors, at least 10 capacitive sensors, at least 25 capacitive sensors, at least 50 capacitive sensors, or at least 100 capacitive sensors.

As in previous embodiments, the plurality of capacitive sensors 612 provide capacitance readings of hair proximal to the haircare apparatus 600, in this case hair within the hair treatment chamber 604, to the moisture estimation module 614, with the moisture estimation module 614 estimating a moisture level of hair within the hair treatment chamber 604. The estimated moisture level may then be either communicated to a user of the haircare apparatus 600, or to a controller of the heaters 608 of the haircare apparatus 600, similar to the manner described in relation to other embodiments of the invention discussed above.

Common to each of the embodiments discussed herein is the use of a plurality of relatively small capacitive sensors to infer a moisture level of hair proximal to a haircare apparatus. This may provide a more accurate indication of moisture level than, for example, a haircare apparatus that uses a single capacitive sensor to estimate a moisture level of hair. Knowledge of a moisture level of hair proximal to the haircare apparatus may inform drying of the hair, such that temperature and/or mechanical damage of hair may be mitigated.

The invention claimed is:

1. A haircare apparatus comprising:

a plurality of capacitive sensors, each capacitive sensor configured to provide a capacitance reading indicative of hair proximal to the haircare apparatus, a moisture estimation module configured to estimate, based on capacitance readings of the plurality of capacitive sensors, a moisture level of the hair proximal to the haircare apparatus, an airflow generator configured to provide an airflow to the hair proximal to the haircare apparatus, and a controller configured to control the airflow generator based on the estimated moisture level of the hair proximal to the haircare apparatus, wherein the moisture estimation module is configured to estimate the moisture level of hair proximal to the haircare apparatus based on a value indicative of air-flow temperature at an air outlet of the haircare apparatus.

2. The haircare apparatus as claimed in claim 1, wherein the haircare apparatus comprises at least 5 capacitive sensors.

3. The haircare apparatus as claimed in claim 1, wherein the haircare apparatus comprises a hair interaction region, and the plurality of capacitive sensors extend along substantially the entirety of a length of the hair interaction region.

4. The haircare apparatus as claimed in claim 1, wherein the plurality of capacitive sensors are disposed in a row along the haircare apparatus.

5. The haircare apparatus as claimed in claim 1, wherein the plurality of capacitive sensors are disposed in a single row along the haircare apparatus.

6. The haircare apparatus as claimed in claim 1, wherein the moisture estimation module is configured to ignore readings from capacitive sensors corresponding to edges of hair proximal to the haircare apparatus.

7. The haircare apparatus as claimed in claim 1, wherein each of the plurality of capacitive sensors comprises a width in the region of 0.5-5.0 mm.

8. The haircare apparatus as claimed in claim 1, wherein each of the plurality of capacitive sensors comprises a length in the region of 0.5-100.0 mm.

9. The haircare apparatus as claimed in claim 1, wherein the controller is further configured to control an output parameter of the haircare apparatus based on the estimated moisture level.

10. The haircare apparatus as claimed in claim 1, wherein the haircare apparatus comprises a heater configured to provide heat to the hair proximal to the haircare apparatus, and the controller is further configured to control the heater based on the estimated moisture level of the hair proximal to the haircare apparatus.

11. The haircare apparatus as claimed in claim 1, wherein the moisture estimation module is further configured to estimate the moisture level of hair proximal to the haircare apparatus based on a value indicative of airflow rate of airflow generated by the airflow generator.

12. The haircare apparatus as claimed in claim 1, wherein the haircare apparatus comprises an alert module configured to alert a user to the estimated moisture level of the hair proximal to the haircare apparatus.

13. The haircare apparatus as claimed in claim 12 wherein the alert module comprises at least one of a haptic feedback module, a visual indicia of the estimated moisture level of the hair proximal to the haircare apparatus, and an aural indicia of the estimated moisture level of hair proximal to the haircare apparatus.

14. The haircare apparatus as claimed in claim 1, wherein the haircare apparatus comprises a transmitter configured to transmit the estimated moisture level of the hair proximal to the haircare apparatus to a remote user device.

15. The haircare apparatus as claimed in claim 1, wherein the haircare apparatus comprises a main body, and an attachment releasably attached to the main body, wherein the attachment comprises the plurality of capacitive sensors.

16. The haircare apparatus as claimed in claim 15, wherein the moisture estimation module is disposed in the attachment.

17. The haircare apparatus as claimed in claim 15, wherein the attachment is configured to communicate the estimated moisture level of the hair proximal to the haircare apparatus to the main body.

18. The haircare apparatus as claimed in claim 15, wherein the attachment comprises a power source configured to power the plurality of capacitive sensors.

19. The haircare apparatus as claimed in claim 1, wherein the haircare apparatus comprises first and second arms that define a hair treatment chamber, and the plurality of capacitive sensors are located on one of the first and second arms such that the plurality of capacitive sensors are exposed to hair within the hair treatment chamber in use.

20. The haircare apparatus as claimed in claim 1, further comprising first and second bristle beds provided on a cylindrically-shaped main body and circumferentially spaced apart from one another, wherein the plurality of capacitive sensors are provided on the main body and aligned in a row extending in an axial direction of the main body, and wherein the plurality of capacitive sensors are disposed between the first and second bristle beds in a circumferential direction of the main body.

21. An attachment for a haircare apparatus, wherein the attachment comprises a plurality of capacitive sensors, each capacitive sensor configured to provide a capacitance reading indicative of hair proximal to the attachment, and a moisture estimation module configured to estimate, based on capacitance readings of the plurality of capacitive sensors, a moisture level of the hair proximal to the attachment, wherein the moisture estimation module is further configured to estimate the moisture level of hair proximal to the attachment based on a value indicative of airflow temperature at an air outlet of the attachment.

* * * * *